Aug. 6, 1946.　　　　C. J. WERNER　　　　2,405,338
ACTUATOR
Filed May 23, 1944

INVENTOR
CALVIN J. WERNER
BY
HIS ATTORNEYS

Patented Aug. 6, 1946

2,405,338

UNITED STATES PATENT OFFICE 2,405,338

ACTUATOR

Calvin J. Werner, Dayton, Ohio, assignor to General Motors Corporation, Detroit, Mich., a corporation of Delaware Application May 23, 1944, Serial No. 536,913

1 Claim. (Cl. 74—291)

This invention relates to an improved load supporting device having an electric motor as prime mover and provided with a manually operated member adapted to act as a secondary driving means.

It is among the objects of the present invention to provide a load supporting device with a single member whose normal function is to render the device adaptable to be driven at a reduced speed by an electric motor, said single member also being adapted to be manually operated to actuate the device independently of the motor.

Further objects and advantages of the present invention will be apparent from the following description, reference being had to the accompanying drawing, wherein a preferred embodiment of the present invention is clearly shown.

Figures 1, 2:
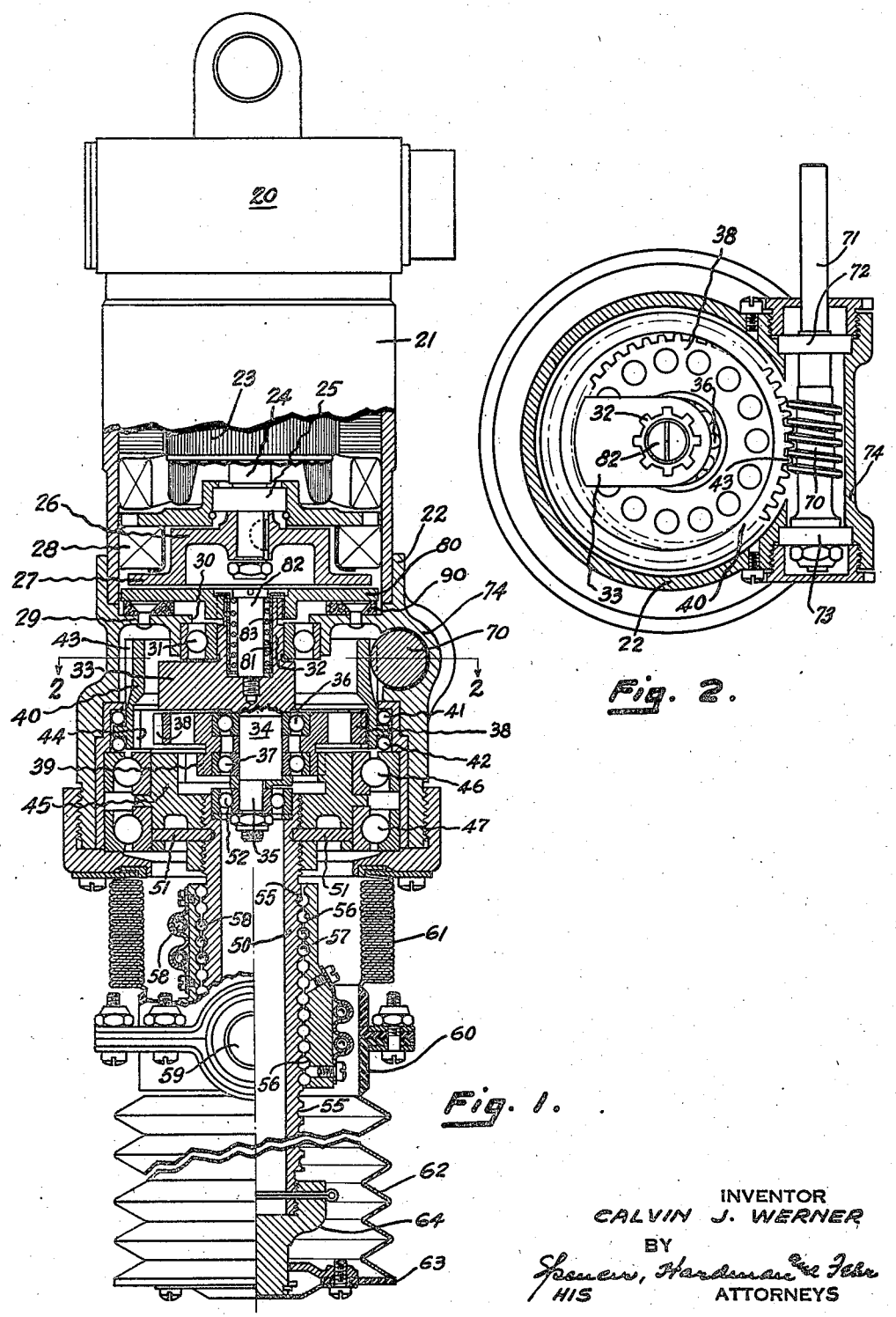
Fig. 1 is a fragmentary, sectional view of the load supporting device.
Fig. 2 is a transverse section taken along the line 2—2 of Fig. 1, parts of the mechanism being shown in elevation for the sake of clarity.

The device illustrated in the present drawing is somewhat similar to the device disclosed in my copending application, Serial No. 468,475, filed December 10, 1942, Patent #2,383,901 and is adapted for the same use. Like the device of the copending application, the present device comprises a screw shaft upon which is mounted a traveling nut which supports the load.

The screw shaft is connected with the shiftable member or armature of an electro-magnetic clutch by a train of speed reducing gearing. Normally, when the device is not operating, the shiftable member or armature is urged into gripping engagement with a brake ring which holds the screw shaft against rotation.

A magnetizable driving disc is operatively connected to the shaft of the prime mover, an electric motor. The electromagnetic clutch has a magnet winding encircling the driving disc to energize it when the said winding is energized so that the armature is moved from the brake ring and into operative engagement with the driving disc.

The magnet winding is energized concurrently with the energization of the electric motor so that as the motor operates the driving disc, the armature, operatively engaging said disc, will act through the speed reducing gearing to operate the screw shaft. The load supporting nut on the screw shaft is held against rotation and therefore rotation of the screw shaft will cause the nut to move longitudinally on the said shaft to shift its load.

Referring to the drawing, the electric motor 20 has a housing or frame 21 secured to one end of the gear housing 22. The armature 23 of the electric motor 20 has a shaft 24 journalled in the bearing 25 and in turn having the cup-shaped driving disc 26 secured thereto so as to rotate therewith. Disc 26 has an outwardly extending annular flange 27. A magnet winding 28 encircles the driving disc 26 and is secured in the motor frame 21 in such a manner as to magnetize the driving disc when energized.

The gear housing 22 has a partition wall 29 provided with an opening 30 coaxial with the armature shaft 24. A roller bearing 31 is supported in opening 30, said bearing carrying a stub shaft comprising a hub portion 32 journalled in bearing 31, a counter-balance weight portion 33, an eccentric hub portion 34 and a hub portion 35 coaxial with the opposite end hub portion 32.

Two roller bearings 36 and 37 are carried by the eccentric hub portion 34 of the stub shaft, said bearings, in turn, supporting the double, epicycloidal gear member which provides the one spur gear 38 and the second and smaller spur gear 39.

An annular ring gear 40 is supported in housing 22 by two ball bearings 41 and 42. Annular ring gear 40 has gear teeth 43 provided in its outer annular surface and also gear teeth 44 provided in its inner annular surface.

The teeth of the epicycloidal spur gear 38 mesh with the inner gear teeth 44 of the annular ring gear 40. The teeth of the epicycloidal spur gear 39 mesh with the teeth of the inner annular ring gear 45 which is journalled in the two ball bearings 46 and 47 carried in housing 22. The pitch diameters and the number of gear teeth in the two cooperating gears 38 and the one consisting of teeth 44 are of a predetermined relativity as are the gears 39 and 45 so that a certain speed reduction is obtained, as will be described.

Ring gear 45 has a central opening which is interiorly threaded to receive the threaded end of the tubular screw shaft 50. Keys 51 immovably secure the ring gear 45 to the screw shaft. A ball bearing 52 is carried in the end of the tubular screw shaft 50 and supports the portion 35 of the stub shaft.

Excepting threaded end portions, the outer surface of screw shaft or tube 50 is provided with a continuous helical groove 55 which corresponds with a helical groove 56 formed in the interior surface of the traveling nut 57. These two coinciding, helical grooves form a helical passage in which the balls 58, which operatively connect the nut to the shaft, may travel. This feature is identical to that disclosed in my copending application referred to heretofore. The nut 57 provides trunnions 59 to which the load supporting arm or lever, not shown, may be attached. A flanged member 60, also secured to the nut, provides an anchorage for the inner ends of two collapsible dust shield sleeves 61 and 62, the outer end of the sleeve 61 being secured to the gear housing 22 in any suitable manner while the outer end of sleeve 62 is attached to member 63 which in turn is supported by the end collar 64 threaded and secured to the lower or outer end of the screw shaft 50.

In order that the epicycloidal speed reduction gearing may operate, it is necessary to hold the annular gear 40 against rotation. For this purpose worm gear 70 is provided, meshing with the outer gear teeth 43 of the annular gear 40. Worm gear 70 is formed on or secured to a shaft 71 which is journalled in ball bearings 72 and 73 carried in a cylindrically shaped extension 74 on the housing 22. A sufficient portion of one end of shaft 71 extends outside the housing 22 to permit attachment of any suitable manually operable actuator, not shown.

The end of the portion 32 of the stub shaft, journalled in the ball bearing 31 extends beyond said bearing and is serrated or channelled to receive a similarly serrated or channelled armature disc 80 whereby said armature disc is splined to said stub shaft so as to rotate therewith, yet be slidable longitudinally thereon.

This end of the stub shaft or more specifically its portion 32 is centrally recessed to receive the retainer cup 81 inwardly flanged at its inner end and outwardly flanged to rest upon the bottom surface of a central recess provided in the armature disc 80. A headed screw stud 82 is provided in the recess of the stub shaft portion 32 and a coil spring 83 surrounds the screw stud, one end of the spring rests upon the inward flange at the lower end of the retainer cup 81 while the other or upper end of the spring engages the head of the screw stud 82. This spring 83 exerts pressure upon the retainer cup 81 so as to urge the armature disc 80, engaged by the upper flange of said cup, into gripping engagement with the brake ring 90 secured to the partition 29 in the housing 22 thereby preventing rotation of the stub shaft which is operatively connected to the screw shaft 50 through the reduction gearing.

When the armature disc is in normal gripping engagement with the brake ring 90 it is spaced from the driving disc flange 27 so as to provide the proper air gap therebetween which may be traversed by the magnetic flux to attract the armature disc 80 and move it into gripping, operative engagement with said driving disc 26 when the electromagnet winding 28 is energized.

Energization of the electromagnet winding 28 is concurrent with energization of the electric motor 20, thus as soon as the motor starts to rotate the driving disc 26 is magnetized, causing it to attract the armature disc 80 and move it from engagement with the brake ring 90 into operative, gripping engagement with the flange portion 27 of said driving disc. Now the armature disc 80 will rotate with the driving disc 26 and, due to the fact that said armature disc 80 is splined to the stub shaft portion 32, the stub shaft will consequently be rotated with said disc 80.

As the stub shaft is rotated in its bearings 31 and 52, the eccentric portion 34 thereof, upon which are mounted the epicycloidal gears 38 and 39, joined in one member, will revolve said gears about its orbit. The gear 38, meshing with the interior teeth 44 of the annular gear 40, which is being held against rotation by the worm gear 70, will consequently be rotated about the stub shaft bearings 36 and 37 and thus the joined gear 39 will be rotated therewith. Gear 39 meshes with the internal annular gear 45 and thus will rotate said gear 45 which is secured to the screw shaft 50.

When the nut 57, which supports the load by means of trunnions 59, is at one end of the screw shaft 50, for instance at its upper end as illustrated in Fig. 1, and the screw shaft is rotated in the proper direction, the nut, held against rotation, will travel downwardly toward the screw cap 64 on the outer end of the screw shaft, thus lowering the load. A reverse rotation of the screw shaft causes the nut to move upwardly along said shaft to lift the load on its trunnions 59. One shield sleeve will be collapsed while the other is expanded due to the travel of the nut.

From the aforegoing it will be seen that the annular gear 40 must be held against rotation in order to render the reduction gearing effective to transmit the rotative motion of the motor driving disc 26 to the screw shaft 50. The worm 70 is so constructed and arranged that its engagement with the exterior teeth 43 of the annular gear 40 will hold said gear against rotation and cannot be rotated in turn by said annular gear. However, rotation of the worm gear will rotate the annular gear 40. Thus the worm gear, a single element, acts in one instance to hold the annular gear against rotation and in another instance to actuate the annular gear by rotating it.

If for any reason the electric motor is rendered inoperative, manually actuated apparatus, connected to shaft 71 of the worm gear 70 may be used to rotate said worm gear and thereby rotate the annular gear 40 engaged by it. As the annular gear 40 is so rotated it, in turn, will rotate the spur gear 38 about the bearings 36 and 37 on the eccentric portion 34 of the now stationary stub shaft held against rotation by the brake 90. The gear 39, joined to gear 38, will rotate therewith on said stub shaft and will, in turn, rotate the annular gear 45 with which it meshes and thus the screw shaft 50, joined to gear 45, will be rotated manually and independently of the electric motor. Under these circumstances the motor armature 23, the driving disc 26, the armature disc 80 and the stub shaft consisting of portions 32, 33, 34 and 35 do not rotate, in fact all are inactive excepting the stub shaft eccentric portion 34 which acts merely as a stationary spindle about which the member providing the spur gears 38 and 39 rotates.

Thus the present invention provides a load supporting device having a member 70 in the form of a worm gear which normally acts to render the device adaptable to be driven at a reduced speed by an electric motor and which, under certain circumstances, may itself be manually actuated to operate the device to perform its functions independently of the electric motor.

While the embodiment of the present invention as herein disclosed constitutes a preferred form, it is to be understood that other forms might be adopted, all coming within the scope of the claim which follows.

What is claimed is as follows:

A unitary load supporting and moving device comprising a main housing and a secondary housing supported on the main housing; of a shaft journalled in the wall of the main housing and having a worm gear the teeth of which extend into the main housing; a sub-assembly insertable as such into the main housing, said sub-assembly comprising an outer shell, bearings in said shell rotatably supporting two internally toothed ring-gears, one of which has outer, peripheral teeth engaged by the teeth of the worm gear, the other ring gear having a screw shaft attached thereto upon which a load supporting and moving nut is threadedly mounted, a stub shaft, one end of which is journalled in the screw shaft, the other end being journalled in the main housing, said stub shaft having an eccentric, intermediate portion upon which a unitary, double epicyclic gear is journalled, said gear engaging and interconnecting the two ring gears; a collar secured to the main housing and holding the sub-assembly in the main housing; a friction ring secured in the main housing; an armature disc slidably keyed to the stub shaft and normally urged into braking engagement with the friction ring; a stator in the secondary housing, an armature having a shaft journalled in the secondary housing and having a driving disc secured to the shaft of the armature; and a magnet coil in the secondary housing about the driving disc.

CALVIN J. WERNER.